June 14, 1949.
A. A. ADAMS
2,472,875
MICROMETER CALIPER
Filed Oct. 10, 1944
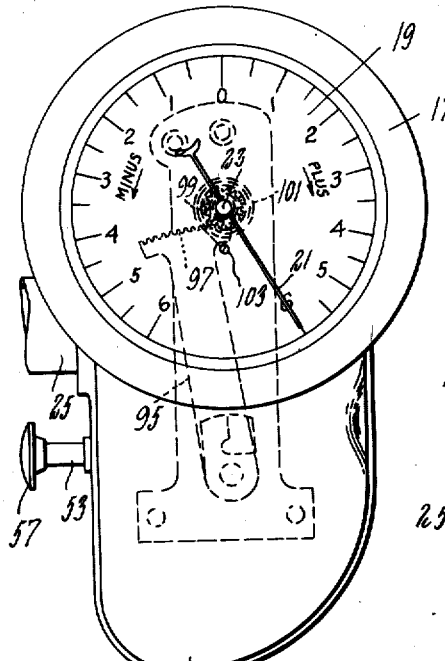
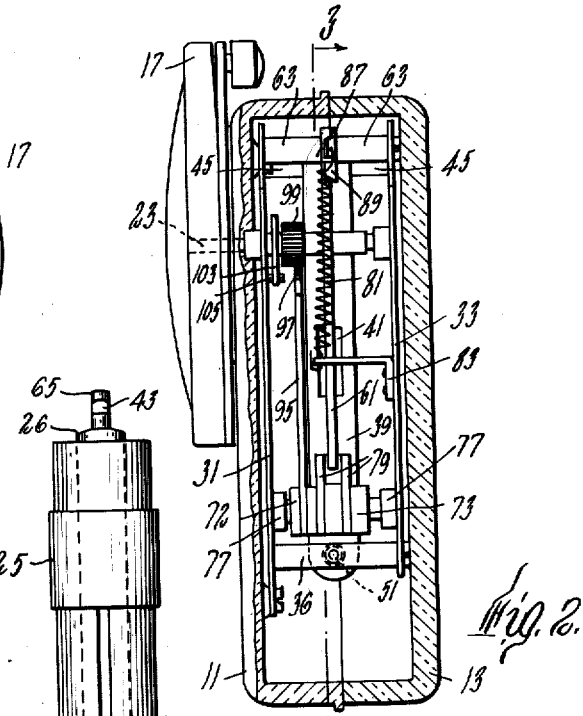
Inventor
Arthur A. Adams
by his Attorney
Alfred H. Hildreth Patented June 14, 1949

UNITED STATES PATENT OFFICE 2,472,875

MICROMETER CALIPER

Arthur A. Adams, Brookline, Mass., assignor to Robert G. Morse, Marblehead, Mass.

Application October 10, 1944, Serial No. 557,995

1 Claim. (Cl. 33—172)

The present invention relates to a micrometer caliper and more particularly to a micrometer caliper of the type disclosed in the United States patent to P. J. Darlington, No. 1,652,854, dated December 13, 1927.

The objects of the present invention are to improve the construction and mode of operation of such an instrument, thereby to reduce to a minimum the possibility of disarrangement or damage to the working parts from normal use, and to improve still further the high degree of accuracy now obtained.

In the instrument disclosed in said patent, means are provided for manually actuating the calipering devices, to reduce the diameter of the internal gage or plug for the purpose of inserting such plug in, or withdrawing it from, a hole or opening. Where the operator actuates such means in a forcible or sudden manner, there is liability of damage to the instrument and particularly to the delicate indicating devices. This is especially true where the taper plunger, which expands the gage, sticks and resists the efforts of the operator to withdraw it. At such times the operator is apt to apply excessive pressure and force in the endeavor to release such plunger, so that when it is finally freed, a sudden and heavy impulse is imparted to the gage and to the amplifying and indicating means which may cause disarrangement and damage to the parts.

Furthermore, in the micrometer gage of the Darlington type as at present constructed, there is noted occasionally a slight variation in readings where repeated measurements or tests are made on the same hole or opening, due, it is believed, to the use of a single, very light spring for actuating the entire train of actuating and amplifying mechanism comprising a number of moving parts and for maintaining contact with the calipering devices which actuate and control such train.

The present invention avoids liability of damage caused in the manner above described when the instrument is manually operated, by providing a separable connection in the train of actuating and amplifying mechanism between the calipering devices and the indicating devices, which connection, in normal operation, is maintained closed so that the indicating devices are under the control of the calipering devices. When, however, excessive and sudden pressure is applied by the operator, the connection, being free and unrestrained, will open so that the indicating devices will be momentarily disconnected from the calipering devices and not subjected to sudden and forcible movement, with the possibility of damage.

In addition to the provision of a separable connection, the instrument has been provided with an additional spring, of substantial tension, for actuating the amplifying lever of said train of connecting mechanism between the calipering and the indicating devices, leaving upon the light spring previously used alone, the duty of moving only a portion of such mechanism. A separate stop device has been provided for stopping the movement of this amplifying lever, thus relieving the stop devices heretofore provided in the instrument from much of the heavy shock and blow they were formerly called upon to absorb.

In the accompanying drawings which illustrate what is now considered the preferred form of the present invention, Fig. 1 is a front elevation, showing the plug or calipering device broken off, and in dotted outline a portion of the actuating and amplifying elements enclosed within the casing; Fig. 2 is a side view with the casing in section and the enclosed mechanism in elevation, on line 2—2 of Fig. 3; Fig. 3 is a front sectional view on line 3—3 of Fig. 2; Fig. 4 is a perspective view of details of the actuating lever, so-called, and the adjacent parts, and Fig. 5 is a view, partly broken away, of the plug or calipering portion of the instrument.

The instrument, as shown in Fig. 1, comprises a hollow, split casing with front and back sections 11 and 13, respectively. These sections are secured together by clamping screws 15, as shown in section in Fig. 3. Projecting from the upper portion of the front section 11 is the indicating gage 17, within which is located the graduated dial 19, over which swings the needle or pointer 21 on the spindle 23.

Clamped between the sections of the casing and extending to the left thereof, as viewed in Fig. 1, is the calipering device or plug 25 of which only the inner portion is illustrated in this figure. This plug is provided with an axially slidable plunger 26 which cooperates with the split outer end 27, the plunger having an accurately ground taper or wedge surface 29 for expanding such end, as shown in said Darlington Patent No. 1,652,854, above referred to, to which reference may be made for further details of construction.

Secured within the casing is the actuating and amplifying mechanism connecting the calipering device or plug with the indicating devices comprising the needle and dial above described. The actuating and amplifying mechanism is mounted in a rigid metal frame which comprises front and back members 31 and 33, respectively, connected by supporting posts 35, 36, 37 and 38. Pivotally mounted upon post 37 is the actuating lever 39, receiving in its longitudinally extending slot 41 the cross-head 43 of the taper plunger for expanding the plug or the calipering device, as shown in said patent. Suitable spacing sleeves 45 are provided for positioning the lever 39 upon the post 37.

The actuating lever 39 is normally urged toward the calipering plug by means of a spring 48, one end of which engages the free end of the lever, and the other the post 36, the spring ends being supported in position, one by the stud 49 fixed in the end of the lever, and the other by the pin 51 secured to the post 36. The post and pin are so positioned and of such length that their ends will engage one another and serve as abutment stops to limit the inward movement of the lever and plunger when they are manually operated by the operator to withdraw the taper plunger within the plug to permit the split end of the plug to contract, as explained in said patent.

Such manual operation of the lever 39 is accomplished by means of the bolt 53 slidingly mounted in the metal sleeve 55 clamped between the two halves of the casing and having its inner end tapered to enter hole 56 in lever 39, and its outer end provided with the finger piece or button 57.

The train of actuating and amplifying mechanism connecting the calipering plug with the indicating devices comprises an amplifying lever 61, which is actuated by the taper plunger within the calipering plug. This lever 61 is pivoted at its upper end upon the post 36, being held midway the ends thereof by the spacing sleeves 63 so that it is in alignment with the outer end or stem 65 of the cross-head 43 on the taper plunger, which stem projects inwardly from the actuating lever 39, in position to contact the amplifying lever 61. This amplifying lever is provided with a circular opening 67 in its upper portion through which passes, with ample clearance, the spindle 23 carrying the pointer or needle 21.

The lower end 68 of the amplifying lever 61 is arranged to engage the upstanding end 69 of the short arm lever 71, fixedly clamped between the flanges 72 and nut 73 rotatably mounted in bearings 77 in the front and back frame members 31 and 33.

The lower end 68 of the amplifying lever 61 is positioned and guided laterally by means of the guiding plates 79 on each side of the short arm lever 71, so that the end 68 of the amplifying lever and extension 69 of the short arm lever 71 will always remain in alignment whether or not they are in contact.

The lower end 68 of the amplifying lever 61 is normally held in contact with the upstanding end 69 of the short arm lever 71 by means of a coiled tension spring 81 secured at its lower end to the bracket 83 fixed upon the back member 33 of the frame and at its upper end to the arm 85 of the clip 87, loosely mounted upon the post 38, with the forwardly turned ear or lug 89 overlying the edge of amplifying lever 61. Thus the amplifying lever is normally urged to the left and in a clockwise direction, as viewed in Figs. 1, 3 and 4, by tension spring 81, being held in contact with the short arm lever 71 and imparting thereto movements of such amplifying lever, received in turn from the calipering plug or device. This spring-pressed contact between the amplifying lever 61 and short arm lever 71 is referred to in this specification and claim as a separable connection, inasmuch as the amplifying lever 61, may under abnormal conditions, break contact momentarily with the lever 71, as will be more fully hereinafter explained.

A stop device to limit the movement of the amplifying lever 61 against tension of spring 81 is provided by the bracket 83 extending from the back member of the frame. This bracket, as shown in Fig. 3, is supported at its rear edge by an extension or abutment 91 formed in both the top and bottom halves of the casing, so that the force of the impact of the lever 61, if it occurs, will be transmitted directly to the casing.

The stopping devices for the actuating lever 39 and for the amplifying lever 61 are so arranged that the actuating lever 39 and the taper plunger for the calipering plug will be stopped by engagement of the stop pins 49 and 51 just before the amplifying lever engages the bracket 83. Thus the impact of these separable parts is divided between the two stopping devices, so that the liability of damage to any of the mechanism by the abrupt stopping of these parts is reduced to a minimum.

From the short arm lever 71 motion is transmitted to the indicating needle or pointer 21 through the rack lever 95 clamped at one end upon the spindle 75 by the flange and nut 72 and 73, and having at its free end a rack segment the gear teeth of which engage the pinion 99 fixed upon the needle spindle 23. Thus when the short arm lever 71 is actuated by the amplifying lever 61, the needle is swung over the dial 19 with its movements greatly amplified.

In order to take up all lost motion in these connections between the amplifying lever 61 and the needle or pointer 21 and hold short arm lever 71 in light contact with amplifying lever 61, a hair spring 101 is provided with its outer end 103 fixed to the pin 105 in the front plate 31 of the frame, and its inner end connected to the needle spindle 23.

In order to limit the rotary motion of the needle in both directions, stops are provided for both ends of the rack segment on the lever 95, and in order to cushion the impact, the stops, shown in Fig. 3 at 107, are formed of rubber held in recesses in the front half of the casing.

The operation of the caliper herein shown and described is, in general, the same as of the instrument of said Patent No. 1,652,854, but due to the modifications introduced by the present invention with respect to certain parts of the mechanism, changes have resulted in the mode of operation as will hereinafter be pointed out.

With the parts in the positions shown in Figs. 1 and 3, which are the normal positions assumed when the instrument is not in use, the operator first presses upon the button 57 thus withdrawing the taper plunger within the caliper plug against the pressure of the actuating and amplifying levers 39 and 61, thereby permitting the end of the plug to contract. The plug is then inserted in the hole to be measured or compared and the button released, whereupon the actuating and amplifying levers 39 and 61 act to force the taper plunger inwardly to expand the plug to a snug fit within the work.

When the operator presses upon the button 57 to actuate lever 39 and thereby permit the split end of the calipering plug to contract, he also actuates amplifying lever 61, swinging its lower end 68 to the right in Fig. 3 against the tension of spring 81. During this movement the short arm lever 71 is maintained in contact with and follows lever 61 by the action of the hair spring 101, the pointer turning in a counter-clockwise direction from the plus graduations of the dial to the minus graduations.

When the button is released to expand the caliper plug in the work, these parts all move in the opposite direction under the action of tension spring 81 and against the hair spring 101, finally coming to rest when the plug becomes seated in the hole.

The amplifying lever 61 is brought in contact by the tension spring 81 with the end of the stem 65 of the taper plunger in its inward movement and comes to rest when the plug is fully expanded in the hole. The lower end of the amplifying lever engaging the short lever 71 actuates the latter and the spindle 75 and segmental lever 95 to rotate the needle or pointer in a clockwise direction against the action of the hair spring 101, all of these parts coming to rest as the plug becomes seated in the hole.

The reading of the needle over the dial is then noted by the operator and compared with the reading when the instrument is applied to a standard or test ring, after which the button is again depressed and the plug removed from the hole.

It will be noted that in the instrument of the present application the taper plunger is moved inwardly to expand the plug not only by the action of the lever 39 under its spring 48 as in the instrument of the patent, but in addition by the action of the amplifying lever 61 under its tension spring 81. Thus in the present instrument there is an increased pressure upon the taper plunger, resulting in a closer or tighter fitting of the split plug within the hole. Furthermore, the greatly increased pressure of the amplifying lever upon the stem of the plunger through the action of tension spring 81 insures a more perfect and uniform contact between these parts, than where, as in instrument of the patent, only a very light pressure is exerted by the action of the hair spring through the several elements of the train of mechanism.

It has been found that the instrument which is the subject of this invention operates with definitely improved, uniformly accurate measurements over the prior type, and it is believed that this is due to the use of the tension spring 81 which urges the amplifying lever forcibly against the stem of the taper plunger. With the instrument of the patent there would occasionally occur a sticking or freezing of the expanded plug in the hole being measured or compared. At such times the operator was liable to attempt to free the plug by imparting excessive pressure to the button until he succeeded in starting the taper plunger backwardly within the plug. At such times the sudden release of the plunger would cause the actuation of the mechanism so forcibly and quickly that damage would occasionally be caused when the fast moving parts were abruptly brought to a stop.

In the instrument of the patent the only provision for averting such damage was the placing of the rubber bumpers such as 107 within the casing to be engaged by the head of the segment lever. Due to the fact, however, that this one stop had to absorb the energy or inertia of all the moving parts, namely, the taper plunger, actuating lever, amplifying lever, short arm lever, segment lever, pinion and needle, it proved insufficient at times to protect the parts from damage.

In the instrument of the present invention it will be noted that two additional stopping devices have been provided, one in the form of pins 49 and 51, to stop the actuating lever 39, and the other in the bracket 83 for stopping the movement of the amplifying lever 61, thus distributing the shock and blow and avoiding liability of damage.

Furthermore, due to the action of the separable connection between the lower end 68 of the amplifying lever and the short arm lever 71, the positive actuation of the short arm lever 71, segmental lever 95, pinion 99, and needle 21 under sudden release of the plunger is eliminated, and the amplifying lever is free to break contact with the short arm lever, leaving such lever and its connections back to the needle all separate and disconnected to follow up the amplifying lever at relatively slow speed under the action of the comparatively light hair spring, thereby removing all liability of damage to the more delicate portions of the mechanism from the inertia of parts moving at high speed.

While in the accompanying drawings and the foregoing specification there has been shown and described a specific form of construction embodying the present invention, it is to be understood that the latter is not limited thereto, but may be embodied in other forms and arrangements within the scope of the appended claim.

Having thus described the invention, what is claimed is:

In an internal micrometer having a casing and a split expansible calipering plug projecting therefrom, a plunger having a wedge surface for expanding the plug, actuating means for said plunger comprising a pivotally mounted actuating lever connected to the plunger within the casing, a spring connected to the lever and forcibly urging the plunger in wedging direction to expand the calipering plug, manually-actuatable means engaging the lever for rocking the same in a direction to retract the plunger and contract the calipering plug, indicating means carried by the casing, and actuating and amplifying connections between the plunger and the indicating means, said connections comprising a pivoted amplifying lever in separable contact with the plunger for positive actuation thereby in one direction when the plunger is moved in plug-contracting direction, a spring urging the amplifying lever into contact with the plunger, a short pivoted lever in separable contact with the amplifying lever and adapted to be positively actuated thereby when the amplifying lever is spring-moved in the direction corresponding to plug-expansion, connections between the short lever and the indicating means for actuating the latter responsively to movement of the short lever, and a spring maintaining contact between the short lever and the amplifying lever during normal axial movements of the plunger but permitting separation of said levers upon sudden retraction of the plunger from wedged condition in the plug.

ARTHUR A. ADAMS.

REFERENCES CITED

The following references are of record in the file of this patent:

UNITED STATES PATENTS

| Number | Name | Date |
| --- | --- | --- |
| 1,639,321 | Wheelock | Aug. 16, 1927 |
| 1,652,854 | Darlington | Dec. 13, 1927 |
| 1,768,931 | Pratt | July 1, 1930 |
| 2,178,745 | Emery | Nov. 7, 1939 |
| 2,336,695 | Maurer | Dec. 14, 1943 |